Figure 1:
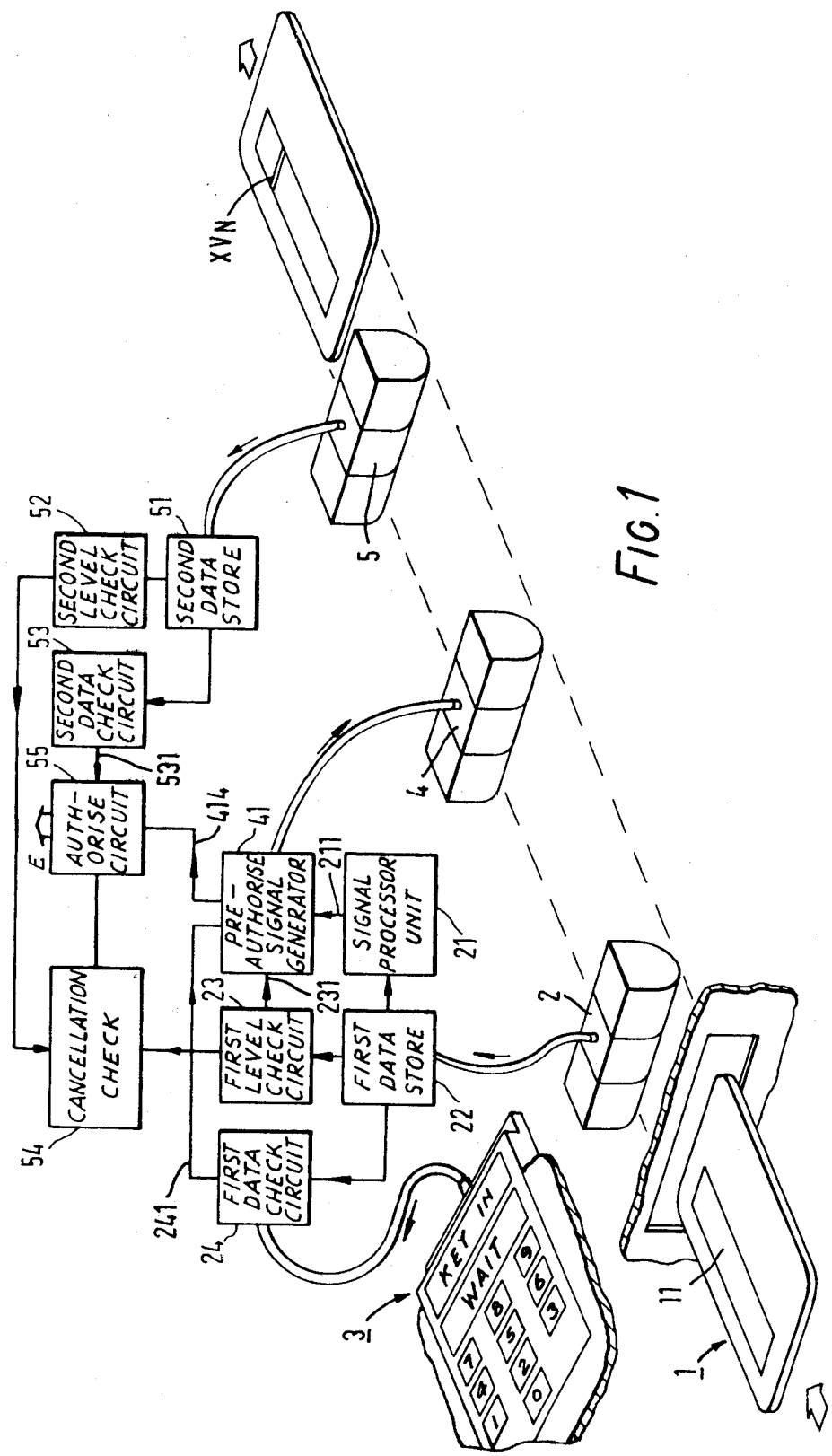

United States Patent [19]

Lee

[11] 4,228,348

[45] Oct. 14, 1980

[54] SECURITY DOCUMENT AND SYSTEM

[75] Inventor: Cyril A. Lee, Littlewick Green, England

[73] Assignee: E M I Limited, Hayes, United Kingdom

[21] Appl. No.: 44,223

[22] Filed: May 31, 1979

Related U.S. Application Data

[63] Continuation-in-part of Ser. No. 859,236, Dec. 9, 1977.

[51] Int. Cl.³ .................. G06K 7/08; G06K 19/06; G11B 25/04; G11B 5/02
[52] U.S. Cl. .................... 235/449; 235/493; 360/2; 360/18; 360/25; 360/57
[58] Field of Search .............. 235/449, 450, 493; 360/2, 18, 25, 39, 40, 56, 131; 340/149 A

[56] References Cited

U.S. PATENT DOCUMENTS

| | | | |
|---|---|---|---|
| 3,562,635 | 2/1971 | Parker | 324/34 |
| 3,627,934 | 12/1971 | Riddle | 235/449 |
| 3,812,529 | 5/1974 | Yoichi | 360/25 |
| 3,873,975 | 3/1975 | Miklos et al. | 235/449 |
| 3,878,367 | 4/1975 | Fayling et al. | 235/449 |
| 3,895,220 | 7/1975 | Nelson et al. | 235/493 |
| 3,927,393 | 12/1975 | Fayling | 360/39 |
| 3,986,205 | 10/1976 | Fayling | 360/2 |
| 4,023,204 | 5/1977 | Lee | 360/56 |
| 4,024,379 | 5/1977 | Pfost et al. | 235/449 |

FOREIGN PATENT DOCUMENTS 1331604  9/1973  United Kingdom ............... 235/449

*Primary Examiner*—Daryl W. Cook
*Attorney, Agent, or Firm*—Fleit & Jacobson

[57] ABSTRACT

A magnetizable anisotropic material layer having a pattern of regions of differently aligned material has an initial pattern of remanent magnetization, when manufactured by applying directional magnetic fields. This pattern is not easily restored, and is generally impossible to restore, after demagnetization or remagnetization. By preserving the residual pattern and selectively removing it in use by the application of a magnetic field, a security feature is provided. A secure document system using such a feature is provided.

10 Claims, 4 Drawing Figures

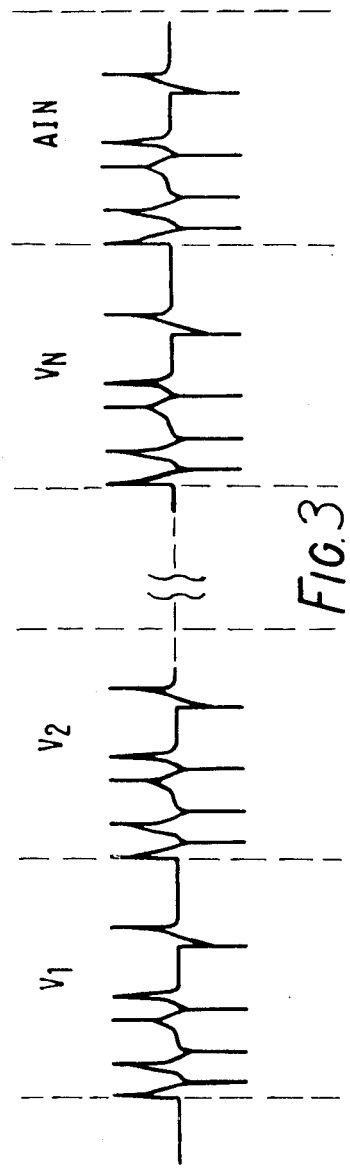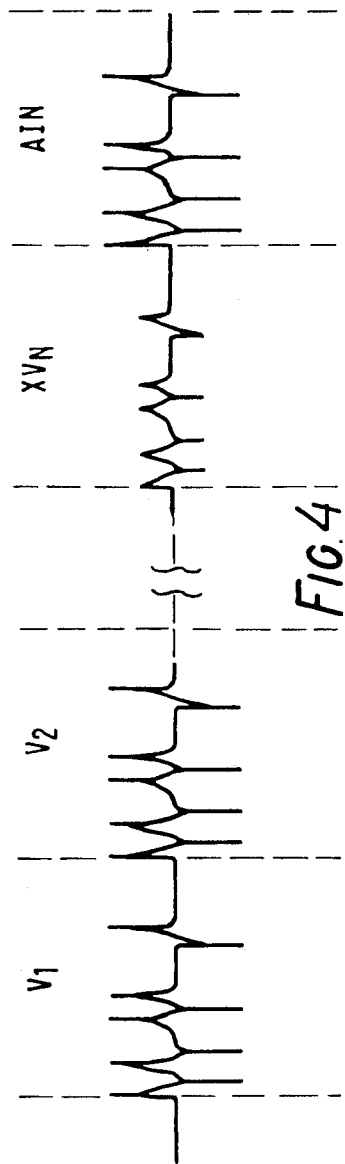

SECURITY DOCUMENT AND SYSTEM

This application is a Continuation in Part of U.S. Application Ser. No. 859,236 filed Dec. 9, 1977.

This invention relates to secure documents and secure document systems.

Secure documents, for example bank notes, cheques, credit cards, tickets, cash dispenser cards, access control cards etc, commonly include a security feature which provides an indication of the validity of the document and/or its value.

An example of such a document is described in our UK Pat. No. 1,331,604 in which the security feature is provided by a fixed pattern of remanent magnetisation. In spaced first regions of the document, anisotropic magnetic particles are fixedly aligned in a binder substantially along a preset direction and in the remaining regions are not so aligned or are aligned along a substantialy different preset direction. This arrangement is often referred to as a magnetic 'watermark' or as having a 'permanent magnetic structure' since the pattern of remanent magnetisation revealed by uniaxially magntising the document (a procedure commonly referred to as 'development') may always be restored even after erasure. As described, for example, In U.S. Pat. No. 3,873,975 or U.S. Pat. No. 3,927,393 the security information revealed by the 'development' of a permanently structured document of this kind may be temporarily erased by the application of an AC erase field, but may subsequently be recovered by the application of a d.c. magnetising field. In this respect the security feature provided by the relative orientations of the fixedly aligned magnetic particles is permanent and may only be destroyed if the document itself is destroyed or damaged.

As a consequence of the 'built-in' nature of the security feature, the techniques of erasure conventionally used for non-watermarked recordings are clearly not suitable for providing a permanent cancellation of the whole or a part of a 'watermarked' stored value document to indicate, for example, a transaction or payment for a journey since, as indicated above, once a 'watermarked' document has been totally or partially erased it may easily be restored to its full value by the application of a developing field.

Hitherto, therefore, in order to permanently cancel part of a document to indicate the exhaustion of the value of that part, it has been necessary to use techniques involving physical destruction, such as punching out the relevant part, over stamping the part, or as described in U.S. Pat. No. 3,895,220 for a magnetically encoded envelope, providing detachable portions. Such techniques are unsatisfactory since the document may be destoried and debris is released, making an accurate examination of the remaining remanence pattern either difficult or impossible.

It is an object of the present invention to provide an improved system for the selective cancellation of a security feature of a security document.

According to the invention there is provided a secure document system comprising a secure document having a security feature of which at least a part is selectively cancellable, and apparatus for performing the cancellation, wherein in spaced first regions of said selectively cancellable part anisotropic magnetic particles are aligned and magnetised substantially solely along a preset direction and in the remaining regions of the part the particles are either not so aligned or are aligned and magnetised substantially solely along a different preset direction, and said apparatus comprises means for reading at least said part and means for cancelling a selected area, which cancelling means applies a uniaxial magnetic field to said area of such a strength and direction that the difference in remanence between said first regions and said remaining regions is significantly reduced.

As implied above the 'cancellation' which is achieved in the present invention is the reduction in the difference in remanence between said first regions and said remaining regions. This reduction is possible for a document of the described type (ie. formed so that the particles are initially magnetised only along their alignment direction—along their easy axis) since for a read head aligned along a preset direction, say, the detected remanence due to unaligned particles, or particles aligned and magnetised solely along a different preset direction is considerably smaller than that detected following uniaxial magnetisation.

The particles in the remaining regions of the part may be aligned and magnetised substantially along a different preset direction, and preferably the preset directions may be orthogonally inclined. In this case the uniaxial magnetic cancelling field may be applied along any direction, but to achieve the maximum difference in remanence between the first and remaining regions the uniaxial magnetic field may preferably be aligned along one of the preset directions.

Clearly the size of the uniaxial magnetic field should be sufficiently large to produce a reduction in the remenance difference detectable by the reading head, and preferably the magnetic field saturates the magnetic material aligned along the one preset direction.

The apparatus may include means for reading the said part before and after cancellation, means for comparing said readings, and means for providing a verification signal in dependence on the correct cancellation being detected.

The cancelling means may be positioned between two reader means. Although the levels of remanent magnetisation along a document may be changed following uniaxial magnetisation, and the detected change is used in the present invention to effect cancellation of an area, the pattern of remanent magnetisation due to regions of differently aligned particles is still detectable and preferably the whole of the security feature forms such a detectable pattern. A reader means in said security document system may detect the information represented by the detectable pattern of remanent magnetisation before and after cancellation, and a verification means provides a verification signal in dependence on said information, detected before and after cancellable, being the same. In this way an erasible simulation of the permanently structured pattern (which may not be detected by the reader before cancellation) would be detected after cancellation since a part of a simulated pattern would be removed by the application of the uniaxial magnetic field.

The apparatus may also include means detecting the reduction in the difference in remanence and means for producing a signal indicating that cancellation has occurred.

Figure 2:
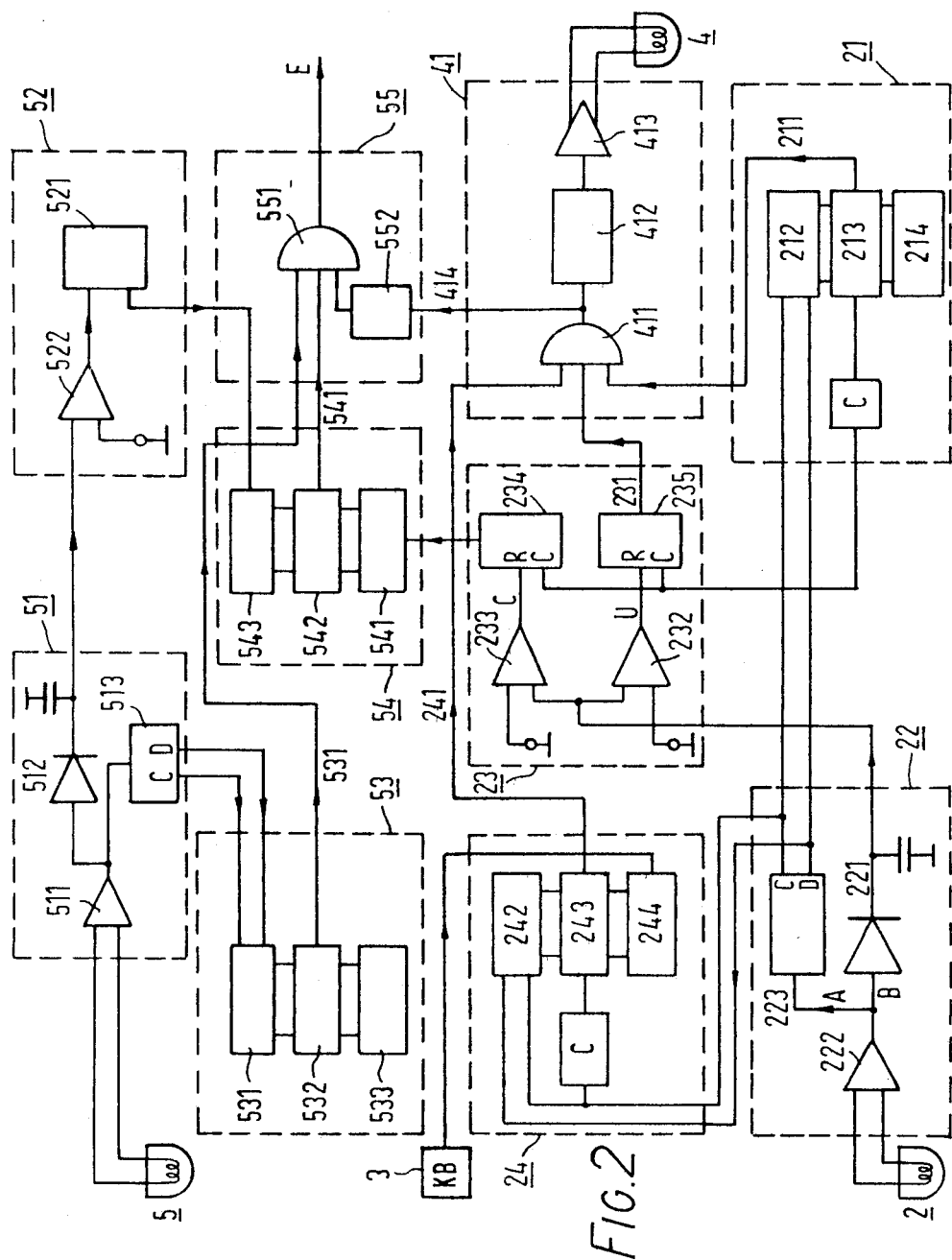

Embodiments of the invention will now be described with reference to the accompanying drawings of which FIG. 1 shows a schematic diagram of a system embodying the invention, FIG. 2 shows in block form the circuitry used in the system, and FIGS. 3 and 4 show waveforms useful in understanding the invention.

UK Pat. No. 1,331,604 describes a security document in the form of a card having a security feature provided by a fixed pattern of remanent magnetisation. Anisotropic magnetic particles are dispersed in a liquid binder on a support member, and in first regions on the support are aligned along a preset direction using a unidirectional magnetic field and in remaining regions are not so aligned or are aligned along a substantially different direction. In the present example the particles are aligned either along or across the length of the support (although this need not be so) and the relative dispositions of the regions of differently aligned particles are arranged to represent the security information. Clearly many magnetisable materials are suitable; those having a shape which aids alignment eg. acicular, or magnetic crystal form eg. anisotropy between the axes of magnetisation in different directions, being particularly desirable. Examples are acicular $\gamma Fe_2O_3$, $CrO_2$, cobalt doped iron oxide, and ferrites such as barium ferrite which has an easy axis of magnetisation perpendicular to the plate like crystal plane. As described in UK Pat. No. 1,331,604 the magnetic particles can be uniaxially magnetised (along the length of the support for example) and the document examined for a pattern of remanent magnetisation which represents the securely stored information. This pattern of remanent magnetisation may be temporarily erased using an AC erasing field, but may then be restored to its former state by further uniaxial magnetisation. When the pattern of remanent magnetisation represents the value of the document (for example the number of transactions or journeys for which the document may be used) it is clearly necessary at each use to permanently cancel that part of the pattern corresponding to the usage in order to reduce its value by an appropriate amount. The conventional methods of temporary erasure used hitherto are clearly unsuitable for this purpose since an exhausted or partially exhausted document may be readily restored to its full value by remagnetisation.

In putting the present invention into effect care is taken that the remanent magnetisation resulting from the alignment of the magnetic particles in each of the two alignment directions on the document is not destroyed. This ensures that the remanent magnetisation resulting from the respective aligning fields is available for detection by the examining apparatus of the present system. These simultaneously present remanences are not easily reproduced once cancelled, and in practice it would certainly require great care and complex apparatus. In consequence of this procedure a reading head oriented to detect remanent magnetisation in one of the alignment directions (across the document, say) will detect no, or at least a negligible remanent magnetisation due to the orthogonally aligned particles in the remaining regions. This is distinct from the conventional condition following undirectional magnetisation of the differently aligned particles, when an appreciable remanent magnetisation is detected in all regions.

Accordingly magnetic material is prepared as described above in the form of a piece of tape with the different zones arranged as a pattern, eg. a binary number, representing information as to the sum of money for which the card is initially valid when supplied to a purchaser. Care is taken that the initial remanent magnetisation of the pattern, resulting from the magnetic fields applied during the alignment of the particles in the binder, is not damaged or changed. Preferably the magnetic material is of high coercivity, eg. at least 500 Oe, and the pattern has a density of a relatively low value, eg. 25 bits per inch. These values will reduce the risk of accidental damage to this initial remanent magnetisation pattern.

In operation the document is presented to suitable examining equipment which permits a required transaction provided certain criteria relating to the value or arthenticity of the document are satisfied. For example a quantity of petrol can be supplied into a vehicle, or access to a secure area may be permitted. At the end of the transaction a part of the initial remanent magnetisation pattern is cancelled in accordance with the value of the transaction. The details of the relation between the progress of the transaction and the cancellation, eg. whether the cancellation is prior to, during and in step with, or after the transaction are not considered here, suitable techniques being available or readily devisable. In the present invention cancellation is brought about by applying a uniaxial magnetising field to the required part of the pattern. In this way the initial variation in the level of remanent magnetisation within that part is destroyed and, as explained above, cannot be restored easily, if at all. Thus as indicated in FIGS. 2 and 3 the signal levels $V_n$ are reduced to $XV_n$ after cancellation so the part is cancelled and the value of the document is reduced and, after full use, exhausted.

To more fully use the potential of the inventive techniques the following system may be used, based on the document described above. The initially recorded pattern is a number of a sequence of sub-value numbers. This pattern when read out by a suitable head, oriented along one of the particle alignment directions, say, would provide the waveforms $V_1$, $V_2$, etc. in FIGS. 3 and 4. The pattern may also include authentication information, AIN in FIGS. 3 and 4, and such information can also or alternatively be provided elsewhere on the card as permanently structured magnetic material or a temporary recording. This area would not be cancelled by uniaxial magnetisation and could act as a reference for the initial remanent magnetisation level. Clearly the actual pattern also provides a secure authentication feature.

On the first use of the document it is presented to a transaction station including the elements shown in a simple arrangement in FIG. 1. The pattern, in the form of a track, is read and the whole content used inter alia to check that the document is authentic and not time expired etc. Also the levels of the sub-value number remanence signals are stored. The signal level, is in this case, the difference in remanent magnetisation between the differently aligned regions.

Thus, as illustrated in FIGS. 1 and 2, in a preferred embodiment the document is intially read using head, 2, and the resulting signals (shown typically in FIGS. 3 and 4) are passed to a first data store, 22. After amplification at 222, the signal path is split into two branches, A and B. In branch A the signals are decoded at 223 providing input to both a 'first data check' unit, 24, and 'a signal processing unit', 21. In branch B, the signals are rectified using a diode and capacitor arrangement, 221, and the resulting signals are passed to a 'first level check' unit, 23, where comparators, 232, and 233, distinguish between signals levels greater than and less than a particular level between, say, the levels $V_n$ and $XV_n$ indicated in FIGS. 3 and 4, so that the counters, 234 and 235, respectively determine the number of cancelled (C) and uncancelled (U) sub value units. Of course when the document is first used all sub-value units are uncancelled so that the counter, 234, will be empty. An output, 231 is produced by counter, 235, provided at least a part of the input signal to comparator, 232, is acceptable ie. large enough to be derived from the remanent magnetisation derived from the initial alignment of particles during the production of the document, so indicating that a part of the document value is unexpired.

Signal, 231, provides one input to a 'preauthorise signal generator', 41, which is arranged to drive a magnetising head, 4, to effect cancellation of a sub-value unit. Circuits 24, and 21, each contain a shift register, 242 and 212 respectively, a comparator, 243 and 213 respectively, and a store, 244 and 214 respectively.

The decoded signals from 223 are clocked into shift registers 242 and 212, and are compared with verfication information in their respective stores. The information in store, 244, is supplied by the operator, via a keyboard, 3, for example and permanent verification information is stored in 214. If the received signals are acceptable then outputs 241 and, 211, from the comparators are also passed to the preauthorise circuit, 41. Provided all three signals, 241, 231 and 211 are received by an AND gate, 411, a signal is generated and passed via a timing mono, 412, to a drive means, 413, for the magnetising head, 4, which applies a uniaxial magnetic field to the document to cancel an unexpired subvalue unit. Thus for example, as indicated in FIGS. 3 and 4, the signal level, $V_n$, is reduced to the value $XV_n$ following cancellation. The AND gate also generates a further signal, 414, which via a delay, 552, provides one input to an authorise circuit, 55, thereby indicating that cancellation has occurred.

Following cancellation, the document is again read using head, 5, and the signals are stored in a 'second data store unit', 51, identical with unit, 22, described above. As before the signals are rectified at 512, and are passed to a 'second level check unit', 52, and a decoder 514 provide an input to a second data check unit, 53, (similar to unit, 21,) which again checks that the security feature permanently encoded in the magnetic 'watermark' is present. In this way an erasable simulation of the 'watermark' (which may not have been detected by the first check) would now certainly be detected since a part of a simulated 'security feature' would have been deleted by the magnetising head, 4. If the data check at 53 is successful a further signal, 531, is passed to the 'authorise circuit', 55. The comparator, 522, and the counter, 521, in the 'second level check circuit', 52, are arranged to detect cancelled units (such as $XV_n$ in FIG. 4) and the number detected is passed to a shift register, 543, in 'cancellation detection unit', 54. Since part of the document has now been cancelled using head, 4, the counts in, 543, and, 234, should differ only by the number of cancelled units (typically a single unit). The number of cancelled units is therefore, added to the value in, 234, and stored at, 541, in unit, 54. A comparator, 542, then compares the values in 543 and 541, and if they are the same, as they should be, generates a signal, 541, as a third input to authorisation unit, 55. Provided all three signals, 541, 414, and 531 are received an AND gate, 551 generates an enabling signal, E, which permits the operation of the apparatus permitting a transaction or an entry to a restricted area etc.

In the embodiment described above each operation of the system brought about by the secure document is basically the same, the authenticity being established as described. Another embodiment of the invention provides a different form of system involving two distinct types of operation.

At present valuable documents such as postal orders are given security by only having a legitimate transfer value when carrying a stamp of an issuing office. Thus the printed order changes its status on being stamped.

A system embodying the invention provides that a secure document is prepared by including in it a permanently structured magnetic material and ensuring that the remanence pattern produced during manaufacture is retained. At this stage the secure document has no legitimate transfer value. At an issuing office, which may be a Post Office or Bank, the retained magnetic pattern is cancelled in a selected area by apparatus of the system to make the document valid in that it bears a distinct code or other pattern, which may include the date and place of validation. The code may be derived in part from a document personal to the person to whom the secure document is issued, eg. an identity card. This variation indicates a legitimate issuing of the document and as authorising the transaction indicated by the document to take place. Again the personal document could be used for checking. When a transaction takes place part of the retained magnetic pattern of a different selected area is cancelled by an amount representing that transaction. Typically the system could be used to pay Social Security or like Welfare benefits, the beneficiary collecting a secure document from a benefit office, which document is validated as described above at the time of collection, and presenting the document for payment in whole or part as desired at any convenient payment Office, say a local Post Office. The system just described thus uses the variation of retained magnetisation in two distinct ways. The secure document can be regarded as money which can be 'switched-on', or made valid, by an irreversible action and thereafter cancelled on exhaustion, by another irreversible action, greatly assisting in the prevention of crime as the unvalidated documents would not easily be converted into valid ones without access to a suitable machine. Even this misuse could be reduced by a code being allocated to each machine and the payment office checking such codes known to have been misused.

In a preferred arrangement based on acicular gamma iron oxide ($Fe_2O_3$) as the magnetic material the residual remanence level is accepted as genuine if constant to within ± 20% of a standard level and the level after cancellation by variation of the magnetisation is reduced to half the residual level. Clearly other levels and tolerance ranges are usuable as will be apparent to those skilled in the art. Cancellation may be by saturation magnetisation.

Suitable apparatus to examine a secure document such as a card is now well-known. A typical apparatus would have a transport path along which a presented card is roller driven past reading and writing magnetic heads and then returned to the presenter, or retained if exhausted or faulty. The path may be reversible to return the card and permit the use of an expensive magnetic head station for more then one function.

Applications for the secure document system include cash dispensing, stored fare transport, vending, access control and banking and travel generally. Also the magnetic material need not be equated with monetary value but could be used to permit only a limited number of entrances to a secure area or other use in which some limitation is required, as opposed to mere verification that a present object is genuine before permitting a transaction or admission.

The above description relates to cards but clearly other objects could carry the permanent pattern of magnetic material.

The techniques described above provide a secure document system in which use of the document is monitored by non-destructive progressive erasure of a security feature which is difficult, if not impossible, to reinstate. The non-destructive erasure avoids the shortcomings of the destructive techniques used hitherto.

What I claim is:

1. A secure document system comprising a secure document having a security feature of which at least a part is selectively cancellable, and apparatus for performing the cancellation, wherein in spaced first regions of said selectively cancellable part anisotropic magnetic particles are aligned and magnetised substantially solely along a preset direction and in the remaining regions of the part the particles are either not so aligned or are aligned and magnetised substantially solely along a different preset direction, and said apparatus comprises means for reading at least said part and means for cancelling a selected area, which cancelling means applies a uniaxial magnetic field to said area of such a strength and direction that the difference in remanence between said first regions and said remaining regions is significantly reduced.

2. A secure document system according to claim 1 wherein the particles in the remaining regions of the part are aligned and magnetised substantially solely along a different preset direction.

3. A secure document system according to claim 2 wherein the preset directions are aligned orthogonally.

4. A secure document system according to claim 2 wherein said cancelling means is arranged to apply a magnetic field along one of the preset directions.

5. A secure document system according to claim 4 wherein the magnetic field saturates the magnetic material aligned along the one preset direction.

6. A secure document system according claim 1 wherein the apparatus includes means for reading at least the said part before and after cancellation, means for comparing said readings, and means for providing a verification signal in dependence on the correct cancellation being detected.

7. A secure document system according to claim 6 wherein the cancelling means is positioned between two reader means.

8. A secure document system according to claim 1 wherein the whole of the security feature has a detectable pattern of remanent magnetisation.

9. A secure document system according to claim 8 wherein the information represented by the detectable pattern of remanent mangetisation is detected by reader means before and after cancellation, and a verification means provides a verification signal in dependence on said detected information being the same.

10. A secure document system according to claim 1 wherein the apparatus includes means for detecting the reduction in the difference in remanace and means for producing a signal indicating that cancellation has occurred.

* * * * *

UNITED STATES PATENT AND TRADEMARK OFFICE
CERTIFICATE OF CORRECTION

PATENT NO. : 4,228,348
DATED : October 14, 1980
INVENTOR(S) : CYRIL A. LEE

It is certified that error appears in the above—identified patent and that said Letters Patent is hereby corrected as shown below:

On the title page, insert

-- (30) Foreign Application Priority Data

December 10, 1976 United Kingdom..........51625/76 --

Signed and Sealed this

Twenty-fourth Day of March 1981

[SEAL]

*Attest:*

RENE D. TEGTMEYER

*Attesting Officer*   *Acting Commissioner of Patents and Trademarks*